US008600391B2

(12) United States Patent
Vendrow et al.

(10) Patent No.: US 8,600,391 B2
(45) Date of Patent: Dec. 3, 2013

(54) CALL MANAGEMENT FOR LOCATION-AWARE MOBILE DEVICES

(75) Inventors: Vlad Vendrow, Redwood Shores, CA (US); Vladimir Shmunis, Hillsborough, CA (US)

(73) Assignee: RingCentral, Inc., San Mateo, CA (US)

( * ) Notice: Subject to any disclaimer, the term of this patent is extended or adjusted under 35 U.S.C. 154(b) by 786 days.

(21) Appl. No.: 12/429,116

(22) Filed: Apr. 23, 2009

(65) Prior Publication Data

US 2010/0130213 A1      May 27, 2010

Related U.S. Application Data

(60) Provisional application No. 61/117,524, filed on Nov. 24, 2008.

(51) Int. Cl.
*H04W 40/00* (2009.01)
*H04W 36/00* (2009.01)
*H04W 24/00* (2009.01)
*H04M 1/00* (2006.01)
*H04M 3/42* (2006.01)
*H04M 7/00* (2006.01)
*H04L 12/28* (2006.01)
*H04L 12/66* (2006.01)

(52) U.S. Cl.
USPC ........ 455/445; 455/456.1; 455/443; 455/557; 455/456.3; 455/567; 455/414.1; 455/456.5; 379/221.01; 379/201.06; 379/211.01; 379/201.12; 379/220.01; 370/352; 370/351

(58) Field of Classification Search
USPC ............................................. 455/445, 456.1
See application file for complete search history.

(56) References Cited

U.S. PATENT DOCUMENTS

| 5,195,131 A | 3/1993 | Sano |
| 5,530,740 A | 6/1996 | Irribarren et al. |
| 5,712,712 A | 1/1998 | Sayward |
| 5,717,742 A | 2/1998 | Hyde-Thomson |
| 5,799,065 A | 8/1998 | Junqua et al. |

(Continued)

FOREIGN PATENT DOCUMENTS

| EP | 0954193 | 11/1991 |
| JP | 64-054889 | 3/1989 |
| JP | 2002-314642 | 10/2002 |
| JP | 2007-006288 | 1/2007 |

(Continued)

OTHER PUBLICATIONS

International Search Report and Written Opinion as issued in Patent Application PCT/US2009/065036 on Jul. 9, 2010.

(Continued)

*Primary Examiner* — Timothy Pham
(74) *Attorney, Agent, or Firm* — Fish & Richardson P.C.

(57) ABSTRACT

A positioning system (e.g., GPS) integrated in, or coupled to, a mobile device determines the position of the mobile device. An availability status manager (ASM) in a vPBX acquires the position of the mobile device. The ASM can contain rules on how to route or otherwise control incoming phone calls based on availability status of one or more mobile devices in the vPBX network. When a call is received by the vPBX, the ASM determines the availability status of the receiving mobile device based on the geographic location of the receiving mobile device. The ASM then routes the call to the receiving mobile device, to another mobile device, or to a landline based on the availability status of the receiving mobile device and the availability status based rules.

15 Claims, 10 Drawing Sheets

(56) References Cited

U.S. PATENT DOCUMENTS

| | | | |
|---|---|---|---|
| 5,889,845 A | 3/1999 | Staples et al. | |
| 5,896,448 A | 4/1999 | Holt | |
| 5,987,535 A | 11/1999 | Knodt et al. | |
| 6,038,451 A | 3/2000 | Syed et al. | |
| 6,041,110 A | 3/2000 | Lautenschlager et al. | |
| 6,104,790 A | 8/2000 | Narayanaswami | |
| 6,230,024 B1 | 5/2001 | Wang | |
| 6,377,950 B1 | 4/2002 | Peters et al. | |
| 6,442,404 B1 | 8/2002 | Sakajiri | |
| 6,542,475 B1 | 4/2003 | Bala et al. | |
| 6,584,093 B1 | 6/2003 | Salama et al. | |
| 6,587,555 B1 | 7/2003 | Cripe et al. | |
| 6,760,324 B1 | 7/2004 | Scott et al. | |
| 6,792,085 B1 | 9/2004 | Rigaldies et al. | |
| 6,801,341 B1 | 10/2004 | Joffe et al. | |
| 6,801,520 B2 | 10/2004 | Philonenko | |
| 6,816,483 B1 | 11/2004 | Beckstrom et al. | |
| 6,870,910 B1 | 3/2005 | Armstrong et al. | |
| 6,879,676 B1 | 4/2005 | Contractor | |
| 6,901,139 B2 | 5/2005 | Gonzalez et al. | |
| 6,950,507 B1 | 9/2005 | Kaplan | |
| 6,967,947 B1 | 11/2005 | Chen et al. | |
| 6,987,840 B1 | 1/2006 | Bosik et al. | |
| 6,993,360 B2 | 1/2006 | Plahte et al. | |
| 6,993,561 B2 | 1/2006 | Lincke et al. | |
| 6,999,469 B1 | 2/2006 | Chu et al. | |
| 7,006,614 B2 | 2/2006 | Feinberg et al. | |
| 7,024,457 B1 | 4/2006 | Newman et al. | |
| 7,024,474 B2 | 4/2006 | Clubb et al. | |
| 7,031,437 B1 | 4/2006 | Parsons et al. | |
| 7,031,447 B2 | 4/2006 | Mani | |
| 7,047,525 B2 | 5/2006 | Prunty et al. | |
| 7,076,558 B1 | 7/2006 | Dunn | |
| 7,110,523 B2 | 9/2006 | Gagle et al. | |
| 7,123,608 B1 | 10/2006 | Scott et al. | |
| 7,162,020 B1 | 1/2007 | Forte | |
| 7,180,638 B1 | 2/2007 | Hou et al. | |
| 7,184,527 B1 | 2/2007 | Lin et al. | |
| 7,245,913 B1 | 7/2007 | Nguyen et al. | |
| 7,254,643 B1 | 8/2007 | Peters et al. | |
| 7,274,684 B2 | 9/2007 | Young et al. | |
| 7,298,833 B2 | 11/2007 | Klein et al. | |
| 7,308,255 B2 | 12/2007 | Loveland | |
| 7,324,635 B2 | 1/2008 | Wood et al. | |
| 7,333,820 B2 | 2/2008 | Sheha et al. | |
| 7,359,368 B1 | 4/2008 | Pearce | |
| 7,369,648 B1 | 5/2008 | Chang | |
| 7,426,218 B1 | 9/2008 | Archer et al. | |
| 7,640,293 B2 | 12/2009 | Wilson et al. | |
| 7,702,669 B2 | 4/2010 | Vendrow et al. | |
| 7,734,294 B2 | 6/2010 | Kent et al. | |
| 7,822,186 B1 | 10/2010 | Boni | |
| 7,941,130 B2 | 5/2011 | Moton, Jr. et al. | |
| 7,996,036 B1 | 8/2011 | Chen et al. | |
| 8,000,454 B1 | 8/2011 | Or-Bach et al. | |
| 8,020,486 B2 | 9/2011 | Yamamoto et al. | |
| 8,134,727 B1 | 3/2012 | Shmunis et al. | |
| 8,213,587 B2 | 7/2012 | Vendrow | |
| 8,305,622 B1 | 11/2012 | Shmunis et al. | |
| 2002/0064149 A1 | 5/2002 | Elliot et al. | |
| 2002/0067714 A1 | 6/2002 | Crain et al. | |
| 2002/0080025 A1 | 6/2002 | Beattie | |
| 2002/0085701 A1 | 7/2002 | Parsons et al. | |
| 2002/0120697 A1 | 8/2002 | Generous et al. | |
| 2002/0122547 A1 | 9/2002 | Hinchey et al. | |
| 2003/0007625 A1 | 1/2003 | Pines et al. | |
| 2003/0008612 A1 | 1/2003 | Andreason | |
| 2003/0017860 A1 | 1/2003 | Choi | |
| 2003/0095541 A1 | 5/2003 | Chang et al. | |
| 2003/0186686 A1 | 10/2003 | Yang et al. | |
| 2004/0005042 A1 | 1/2004 | Dhara et al. | |
| 2004/0028208 A1 | 2/2004 | Carnazza et al. | |
| 2004/0111305 A1 | 6/2004 | Gavan et al. | |
| 2004/0120479 A1 | 6/2004 | Creamer et al. | |
| 2004/0121814 A1 | 6/2004 | Creamer et al. | |
| 2004/0160951 A1 | 8/2004 | Galvin et al. | |
| 2004/0176083 A1 | 9/2004 | Shiao et al. | |
| 2004/0198332 A1 | 10/2004 | Lundsgaard | |
| 2004/0202300 A1 | 10/2004 | Cooper et al. | |
| 2004/0203918 A1 | 10/2004 | Moriguchi et al. | |
| 2004/0204038 A1 | 10/2004 | Suzuki et al. | |
| 2004/0218748 A1 | 11/2004 | Fisher | |
| 2004/0229620 A1* | 11/2004 | Zhao et al. | 455/445 |
| 2005/0047373 A1 | 3/2005 | Kojima | |
| 2005/0047579 A1 | 3/2005 | Salame | |
| 2005/0070310 A1* | 3/2005 | Caspi et al. | 455/456.5 |
| 2005/0083915 A1 | 4/2005 | Mathew et al. | |
| 2005/0088686 A1 | 4/2005 | Tanimoto | |
| 2005/0117733 A1 | 6/2005 | Widger et al. | |
| 2005/0141479 A1 | 6/2005 | Ozugur et al. | |
| 2005/0153739 A1 | 7/2005 | Haisell | |
| 2005/0180551 A1 | 8/2005 | Meek et al. | |
| 2005/0195802 A1 | 9/2005 | Klein et al. | |
| 2005/0207556 A1 | 9/2005 | Gonzalez et al. | |
| 2006/0008066 A1 | 1/2006 | Starling et al. | |
| 2006/0018454 A1 | 1/2006 | Nonaka et al. | |
| 2006/0023657 A1 | 2/2006 | Woodson et al. | |
| 2006/0030357 A1 | 2/2006 | McConnell et al. | |
| 2006/0043164 A1 | 3/2006 | Dowling et al. | |
| 2006/0077957 A1 | 4/2006 | Reddy et al. | |
| 2006/0085516 A1 | 4/2006 | Farr et al. | |
| 2006/0099931 A1 | 5/2006 | Trujilo | |
| 2006/0116127 A1 | 6/2006 | Wilhoite et al. | |
| 2006/0126806 A1 | 6/2006 | Trandal et al. | |
| 2006/0135202 A1 | 6/2006 | Ho et al. | |
| 2006/0148490 A1 | 7/2006 | Bates et al. | |
| 2006/0160566 A1 | 7/2006 | Plahte et al. | |
| 2006/0161435 A1 | 7/2006 | Atef et al. | |
| 2006/0205393 A1 | 9/2006 | Veen | |
| 2006/0205436 A1 | 9/2006 | Liu et al. | |
| 2006/0210050 A1 | 9/2006 | Bartfeld et al. | |
| 2006/0215543 A1 | 9/2006 | Croak et al. | |
| 2006/0253895 A1 | 11/2006 | Brandofino et al. | |
| 2007/0021098 A1 | 1/2007 | Rhodes et al. | |
| 2007/0047534 A1 | 3/2007 | Hakusui | |
| 2007/0058637 A1 | 3/2007 | Lo | |
| 2007/0060137 A1 | 3/2007 | Yeatts et al. | |
| 2007/0070976 A1 | 3/2007 | Mussman et al. | |
| 2007/0105531 A1 | 5/2007 | Schroeder, Jr. | |
| 2007/0111716 A1 | 5/2007 | Leigh et al. | |
| 2007/0115498 A1 | 5/2007 | Noel et al. | |
| 2007/0115978 A1 | 5/2007 | Kondo | |
| 2007/0173237 A1 | 7/2007 | Roundtree | |
| 2007/0198677 A1 | 8/2007 | Ozhan et al. | |
| 2007/0253545 A1 | 11/2007 | Chatterjee et al. | |
| 2007/0266077 A1 | 11/2007 | Wengrovitz | |
| 2007/0298771 A1* | 12/2007 | Mottes | 455/414.1 |
| 2008/0002820 A1 | 1/2008 | Shtiegman et al. | |
| 2008/0032704 A1 | 2/2008 | O Neil et al. | |
| 2008/0032716 A1 | 2/2008 | Forte | |
| 2008/0037763 A1 | 2/2008 | Shaffer | |
| 2008/0043976 A1* | 2/2008 | Maximo et al. | 379/220.01 |
| 2008/0056234 A1 | 3/2008 | Sprague | |
| 2008/0075261 A1 | 3/2008 | Ramanathan et al. | |
| 2008/0118052 A1 | 5/2008 | Houmaidi et al. | |
| 2008/0144804 A1 | 6/2008 | Mergen | |
| 2008/0186929 A1 | 8/2008 | Rice et al. | |
| 2008/0240376 A1 | 10/2008 | Conway et al. | |
| 2008/0279362 A1 | 11/2008 | Yasrebi et al. | |
| 2008/0298567 A1 | 12/2008 | Guile | |
| 2008/0318561 A1 | 12/2008 | Olshansky et al. | |
| 2009/0015876 A1 | 1/2009 | Brown | |
| 2009/0029724 A1 | 1/2009 | Hardy et al. | |
| 2009/0054032 A1 | 2/2009 | Ren et al. | |
| 2009/0059818 A1 | 3/2009 | Pickett | |
| 2009/0080029 A1 | 3/2009 | Vendrow et al. | |
| 2009/0086278 A1 | 4/2009 | Vendrow et al. | |
| 2009/0086947 A1 | 4/2009 | Vendrow | |
| 2009/0086950 A1 | 4/2009 | Vendrow et al. | |
| 2009/0086953 A1 | 4/2009 | Vendrow | |
| 2009/0097632 A1 | 4/2009 | Carnazza et al. | |
| 2009/0116466 A1 | 5/2009 | Lee et al. | |
| 2009/0131080 A1* | 5/2009 | Nadler et al. | 455/456.3 |
| 2009/0154666 A1 | 6/2009 | Rios et al. | |

(56) References Cited

U.S. PATENT DOCUMENTS

| | | | |
|---|---|---|---|
| 2009/0154678 A1 | 6/2009 | Kewin et al. | |
| 2009/0202050 A1 | 8/2009 | Berger et al. | |
| 2009/0296907 A1 | 12/2009 | Vendrow et al. | |
| 2009/0310598 A1 | 12/2009 | Winbladh et al. | |
| 2010/0002626 A1 | 1/2010 | Schmidt et al. | |
| 2010/0015995 A1* | 1/2010 | Caspi et al. | 455/456.1 |
| 2010/0029272 A1 | 2/2010 | McCann et al. | |
| 2010/0035594 A1 | 2/2010 | Vendrow et al. | |
| 2010/0039676 A1 | 2/2010 | Noel et al. | |
| 2010/0039677 A1 | 2/2010 | Noel et al. | |
| 2010/0039678 A1 | 2/2010 | Noel et al. | |
| 2010/0039679 A1 | 2/2010 | Noel et al. | |
| 2010/0046037 A1 | 2/2010 | Noel et al. | |
| 2010/0046731 A1 | 2/2010 | Gisby et al. | |
| 2010/0080214 A1 | 4/2010 | Li et al. | |
| 2010/0081380 A1 | 4/2010 | Lim et al. | |
| 2010/0099390 A1 | 4/2010 | Vendrow et al. | |
| 2010/0099418 A1* | 4/2010 | Holley et al. | 455/445 |
| 2010/0113013 A1* | 5/2010 | Karabinis et al. | 455/426.1 |
| 2010/0128291 A1 | 5/2010 | Vendrow et al. | |
| 2010/0128861 A1 | 5/2010 | Vendrow et al. | |
| 2010/0128862 A1 | 5/2010 | Vendrow | |
| 2010/0128867 A1 | 5/2010 | Vendrow et al. | |
| 2010/0130172 A1 | 5/2010 | Vendrow et al. | |
| 2010/0130228 A1 | 5/2010 | Vendrow et al. | |
| 2010/0183134 A1 | 7/2010 | Vendrow et al. | |
| 2010/0184408 A1 | 7/2010 | Vendrow et al. | |
| 2010/0185584 A1 | 7/2010 | Vendrow et al. | |
| 2011/0053643 A1 | 3/2011 | Shmunis | |
| 2011/0110511 A1 | 5/2011 | Vendrow et al. | |
| 2011/0130168 A1 | 6/2011 | Vendrow et al. | |
| 2011/0153668 A1 | 6/2011 | Walker et al. | |
| 2011/0177797 A1 | 7/2011 | Vendrow et al. | |
| 2011/0191441 A1 | 8/2011 | Herriman et al. | |
| 2011/0293083 A1 | 12/2011 | Larson et al. | |
| 2012/0021730 A1 | 1/2012 | Vendrow | |
| 2012/0021750 A1 | 1/2012 | Vendrow et al. | |
| 2013/0016822 A1 | 1/2013 | Vendrow | |

FOREIGN PATENT DOCUMENTS

| | | |
|---|---|---|
| KR | 1020000023675 | 4/2000 |
| KR | 1020010011139 | 2/2001 |
| KR | 1020020086695 | 11/2002 |
| KR | 1020040039569 | 5/2004 |
| KR | 1020050014088 | 2/2005 |
| KR | 1020050000884 | 6/2005 |
| KR | 1020050061255 | 6/2005 |
| KR | 1020050116096 | 12/2005 |
| KR | 1020060096568 | 9/2006 |
| KR | 1020060115833 | 11/2006 |
| KR | 1020070006314 | 1/2007 |
| KR | 10-0815239 | 3/2008 |
| KR | 1020080029682 | 4/2008 |
| KR | 1020090058808 | 6/2009 |
| KR | 1020100065221 | 6/2010 |
| WO | WO 95/11578 | 4/1995 |
| WO | WO 98/23080 | 5/1998 |
| WO | WO 98/27754 | 6/1998 |
| WO | WO 98/34391 | 8/1998 |
| WO | WO 98/47298 | 10/1998 |
| WO | WO 2006/022421 | 3/2006 |
| WO | WO 2006/056983 | 6/2006 |
| WO | WO 2007/025950 | 3/2007 |
| WO | WO 2007/053420 | 5/2007 |
| WO | WO 2008/074122 | 6/2008 |
| WO | WO 2010/059756 | 5/2010 |
| WO | WO 2010/062981 | 6/2010 |

OTHER PUBLICATIONS

"California Inventors Develop Caller Identification Based Call Routing Feature", US Fed News Services, Including US State News, Jan. 29, 2008, pp. 1-2.

"Call Routing Rules," IBM Lotus Sametime Unified Telephony Administrator's Guide, IBM Corp., 2009, p. 177; see also, Call Routing Rules <http://publib.boulder.ibm.com/infocenter/sametime/v8ro/index.jsp?topic=/com.ibm.help.sametime.telphony.doc/sut_adm_monitor_rules_c.html>.

Cho, G., et al., "An Efficient Location and Routing Scheme for Mobile Computing Environments", IEEE Journal on Selected Areas in Communications, Jun. 1995, pp. 1-11, vol. 13, Issue 5.

Copenheaver, B., Notification of the Transmittal of the International Search Report and Written Opinion of the International Searching Authority, or the Declaration, International Application No. PCT/US2008/077546; Date of Mailing Dec. 8, 2008; Form PCT/ISA/220 (1 page); Form PCT/ISA/210 (2 pages); Form PCT/ISA/237 (5 pages).

Copenheaver, B., Notification of the Transmittal of the International Search Report and Written Opinion of the International Searching Authority, or the Declaration; International Application No. PCT/US2008/077683, date of mailing Dec. 10, 2008, Form PCT/ISA/220 (1 page); Form PCT/ISA/210 (2 pages); Form PCT/ISA/237 (6 pages).

International Search Report and Written Opinion in Application No. PCT/US2009/065969, dated May 28, 2010.

International Preliminary Report on Patentability as issued in Patent Application PCT/US2009/065969 on Jun. 9, 2011, 6 pages.

International Preliminary Report on Patentability as issued in Patent Application PCT/US2009/065036 on Jun. 3, 2011, 7 pages.

Konstantoulakis, M. G., et al., Call Management Policy Specification for the Asterisk Telephone Private Branch Exchange, IEE Workshop on Policies for Distributed Systems and Networks (Policy 2007), Jun. 13, 2007, pp. 1-11, Bologna, Italy.

Sripanidkulchai, et al., "Call Routing Management in Enterprise VoIP Networks", INM '07, Aug. 27-31, 2007, ACM SIGCOMM Workshop, pp. 1-6, Kyoto, Japan.

Lam, D., et al., "Modeling Location Management in Personal Communication Services", Oct. 18, 1995, pp. 1-27, IEEE International Conference on Universal Personal Communications, 1996.

Lam, D., et al., "Teletraffic Modeling for Personal Communications Services", IEEE Communications Magazine, Feb. 1997, pp. 1-9, Stanford University.

L'Ecuyer, M., et al., "Using Skills-based Routing to Enhance Contact Center Revenue and Performance. (Call Center/CCM Management Scope)," The Free Library (May 1, 2003) http://www.thefreelibrary.com/Using+skills-based+routing+to+enhance+contact+center+revenue+and...-a0102137613.

Maniatis, P., et al., "The Mobile People Architecture", Mobile Computing and Communications Review, vol. 3, Issue 3 (Jul. 1999), pp. 36-42, see also, http://portal.acm.org/citation.cfm?id=329153.

Mintz-Habib, M., et al., "A VoIP Emergency Services Architecture and Prototype", Computer Communications and Networks, 2005. ICCCN 2005, "Fourteenth International Conference on Computer Communications and Networks", Issue date Oct. 17-19, 2005, pp. 1-6, Columbia University.

"Remote access RADIUS attributes: Remote Access," Microsoft Technet, Microsoft Corporation, http://technet.microsoft.com/en-us/library/cc728366(WS.10).aspx (last updated Jan. 21, 2005).

Stokes, S., et al., "A Priority System to Improve Callback Success in Telephone Surveys", Proceedings of the Survey Research Methods Section American Statistical Association, 1990, pp. 742-747, University of Texas at Austin, Austin, Texas.

Wang, H. et al., "ICEBERG: An Internet-core Network Architecture for Integrated Communications", pp. 1-13, IEEE, Personal Communications, vol. 7, Issue 4 (Aug. 2000).

"Automated Phone Trees: Two Potential Solutions," [online] Jul. 5, 2009; Retrieved from the Internet: <URL: http://developmentally.wordpress.com/2009/07/05/automated-phone-trees-two-potential-solutions/>; 3 pages.

Asterisk, I.T., "Asterfax—Asterisk Fax," Aug. 25, 2007, XP002598206. Retrieved from the Internet: <URL: http://web.archive.org/web/2007082533700/http://asterfax.sourceforge.net/index.html [retrieved on Aug. 24, 2010].

(56) References Cited

OTHER PUBLICATIONS

Kaluza, Marcin, "Fax Services: Send Any Printable File from Your Program in Windows 2000" MSDN Magazine, Aug. 31, 2001, XP002598207. Retrieved from the Internet: <URL:http://msdn/microsoft/com/en-us/magazine/cc301661.aspx [retrieved on Jul. 9, 2012], 9 pgs.
AU Office Action dated Aug. 1, 2012 from Australian Patent Application No. 2008309022, 5 pages.
CN Office Action dated Apr. 23, 2012 from Chinese Patent Application No. 200880109068.6 (with English Translation), 18 pages.
CN Office Action dated Feb. 18, 2013, from Chiense Patent Office No. 200880109068.6 (with English Translation), 8 pages.
USPTO Final Office Action in U.S. Appl. No. 12/237,181, mailed Jun. 4, 2012, 22 pages.
USPTO Non-Final Office Action in U.S. Appl. No. 12/626,075, mailed Jul. 6, 2012, 16 pages.
USPTO Non-Final Office Action in U.S. Appl. No. 12/237,181, mailed Oct. 26, 2011, 22 pages.
USPTO Office Action in U.S. Appl. No. 12/429,116, mailed Apr. 12, 2012, 11 pages.
USPTO Office Action in U.S. Appl. No. 12/429,116, mailed Sep. 11, 2012, 7 pages.
USPTO Office Action in U.S. Appl. No. 13/245,837, mailed Apr. 4, 2012, 19 pages.
Authorized Offcier A. Nickitas-Etienne. International Preliminary Report on Patentability in International Application No. PCT/US2009/065036, Date of Mailing May 24, 2011, 6 pages.
Authorized Officer S. H. Hwang. International Search Report and the Written Opinion in International Application No. PCT/US2009/065036; Date of Mailing Jul. 9, 2010, 10 pages.
Authorized Officer Copenheaver, Blaine R., International Search Report and the Written Opinion in International Application No. PCT/US2009/045703, mailed Jul. 29, 2009, 5 pages.
European Search Report in European Application No. 08833680.4-1522/2193655, dated Sep. 9, 2010, 11 pages.
European Search Report in European Patent Application No. 08835856.9-2414/2193654, dated Jan. 30, 2012, 7 pages.
International Initial Publication with ISR in International Application No. PCT/US2008/077683, dated Apr. 9, 2009.
International Preliminary Report on Patentability from International Application No. PCT/US2008/077683, dated Mar. 30, 2010.
International Preliminary Report on Patentability from International Application No. PCT/US2009/051598, dated Feb. 8, 2011.
International Preliminary Report on Patentability from International Application No. PCT/US2009/051751, dated Apr. 26, 2011, 7 pages.
International Preliminary Report on Patentability from International Application No. PCT/US2009/065055, dated May 24, 2011, 5 pages.
International Preliminary Report on Patentability from International Application No. PCT/US2009/065985, dated May 31, 2011, 4 pages.
International Preliminary Report on Patentability from International Application No. PCT/US2009/065976, dated May 31, 2011, 5 pages.
International Preliminary Report on Patentability from International Application No. PCT/US2009/065987, dated May 31, 2011.
International Preliminary Report on Patentability from International Application No. PCT/US2010/044196, dated Mar. 6, 2012, 5 pages.
International Preliminary Report on Patentability in International Application No. PCT/US2009/065038, dated May 24, 2011.
International Preliminary Report on Patentability International Application No. PCT/US2009/051768, dated May 31, 2011.
International Search Report and Written Opinion from International Application No. PCT/US2009/051751, dated Mar. 5, 2010, 3 pages.
International Search Report and Written Opinion from International Application No. PCT/US2009/051598, dated Mar. 9, 2010, 10 pages.
International Search Report and Written Opinion from International Application No. PCT/US2009/051768, dated Feb. 25, 2010, 8 pages.
International Search Report and Written Opinion from International Application No. PCT/US2009/065055, dated Jul. 7, 2010.
International Search Report and Written Opinion from International Application No. PCT/US2009/065985, dated Jun. 18, 2010.
International Search Report and Written Opinion from International Application No. PCT/US2009/065038, dated Jun. 25, 2010, 11 pages.
International Search Report from International Application No. PCT/US2009/065976, dated Jun. 24, 2010, 7 pages.
International Search Report and Written Opinion from International Application No. PCT/US2009/065987, dated Jul. 8, 2010, 7 pages.
International Search Report and Written Opinion from International Application No. PCT/US2010/044196, dated Apr. 29, 2011, 7 pages.
International Search Report from International Application No. PCT/US2010/052880, dated Jun. 27, 2011 6 pages.
International Search Report from International Application No. PCT/US2010/022075, dated Feb. 28, 2011, 8 pages.
International Search Report and Written Opinion from Internal Application No. PCT/US2010/058569, dated Aug. 18, 2011, 8 pages.

* cited by examiner

700

Register this location

Your current address: 12345 Elm Street
Coconut Beach, CA 998765

Your current status: Not defined

┌─710─┐   ┌─720─┐   ┌─730─┐   ┌─740─┐
Register   Register   Register   Register
Current    Current    Current    Current
Room       Building   Block      City Label: _____ 750

Action: [Route to Phone ▼] 755

760 [ Submit ]

| < Settings | Forwarding Rules |

Location-based call forwarding

Add Location >

| Cancel | Edit Rule | Save |

When I am at the location specified below:

Enter Address ○
Label: Name this location

Forward incoming calls to:

mobile: 415-123-4455 ✓
phone 1: 415-888-7777
phone 2: 415-665-9876
Directly to voicemail User can enter location manually or tap "Current Location" button

| Cancel | Edit Rule | Save |

When I am at the location specified below:

Current location ⊗
Label: Name this location

Forward incoming calls to:

mobile: 415-123-4455 ✓
phone 1: 415-888-7777
phone 2: 415-665-9876
Directly to voicemail Current Location defined by GPS

FIG. 8C

840
Cancel | Edit Rule | Save

When I am at the location specified below:

| Enter Address | ○ |
| Label: | Name this location |

Forward incoming calls to:

| mobile: | 415-123-4455 ✓ |
| phone 1: | 415-888-7777 |
| phone 2: | 415-665-9876 |
| Directly to voicemail | |

User manually entered location

FIG. 8D

850
< Settings | Forwarding Rules

Location-based call forwarding

| Office | > |
| Add Location | > |

FIG. 8E

860
Cancel | Forwarding | Save

When I am at the location specified below:

| 1 Lagoon Drive, CA 94065 | ⊗ |
| Label: | Office |

Forward incoming calls to:

| mobile: | 415-123-4455 ✓ |
| phone 1: | 415-888-7777 |
| phone 2: | 415-665-9876 |
| Directly to voicemail | |

Delete Location

FIG. 8F

| 910 | 920 | 930 | 940 | 950 | 960 |
|---|---|---|---|---|---|
| Lat. | Long. | Alt. | Proximity Radius | Location | Action |
| N33.781702 | -117.583544 | 60 | 20 | Office | Route to desk phone |
| N37.410754 | -121.941279 | 50 | 10 | Home | Forward to 650-555-1212 |
| ⋮ | | | | | |

FIG. 9

CALL MANAGEMENT FOR LOCATION-AWARE MOBILE DEVICES

CROSS-REFERENCE TO RELATED APPLICATIONS

This application claims priority to pending U.S. Provisional Application Ser. No. 61/117,524, filed Nov. 24, 2008, the entire contents of which are hereby incorporated by reference.

TECHNICAL FIELD

This subject matter relates to managing calls for mobile devices.

BACKGROUND

A private branch exchange ("PBX") is a telephone network that serves a business or an office. A virtual PBX ("vPBX") allows a business or office to be served by a PBX system hosted on remote servers. The service is provided through a combined voice network (e.g. telephone network) and data network (e.g. Internet). A vPBX typically involves one or more voice-over-IP ("VOIP") servers, a call management program, a network, a gateway that links the voice network and data network, and one or more extensions. In a conventional vPBX system, the servers and gateways are usually unaware of the geographical location of the extensions. Therefore, conventional vPBX systems are not well suited to routing and controlling calls based on geographic locations of mobile devices connected to the vPBX system.

SUMMARY

A positioning system (e.g., GPS) integrated in, or coupled to, a mobile device determines the position of the mobile device. An availability status manager ("ASM") in a vPBX can acquire the position of the mobile device from the positioning system. The ASM can contain rules on how to route or otherwise control incoming phone calls based on availability status of one or more mobile devices in the vPBX network. When a call is received by the vPBX, the ASM can determine the availability status of the receiving mobile device based on the geographic location of the receiving mobile device. The ASM then routes the call to the receiving mobile device, to another mobile device, or to a landline based on the availability status of the mobile device and the rules.

The details of one or more implementations of call management for location-aware mobile devices are set forth in the accompanying drawings and the description below. Other features, objects, and advantages of the techniques will be apparent from the description and drawings, and from the claims.

DESCRIPTION OF DRAWINGS

FIG. 7 illustrates an example user interface for a user to define availability status based on a present location of a mobile device.

FIGS. 8A-8F illustrate an example user interface for editing action rules and location rules.

FIG. 9 illustrates an example rule database.

Like reference symbols in the various drawings indicate like elements.

DETAILED DESCRIPTION

System Overview

Many modern mobile devices have built-in positioning technology (e.g., Global Positioning System ("GPS") receivers or triangulation programs), allowing each device to identify its geographic location. A mobile device is a portable computer device that can wirelessly connect to a data network or a voice network or both. A mobile device typically has a display screen or a keyboard, or both. A mobile device can be a cellular phone, a personal digital assistant (PDA), a handheld computer, etc. A vPBX system can use that location to determine the status of the owner of the mobile device (e.g., out of the office, in the office, at home, busy, etc.). A PBX system can include one or more VOIP servers, a call management program, and a gateway between data and voice network. A virtual PBX (VPBX) system is a PBX system whose VOIP servers, call management program, and gateway that are located remotely from the office or business, typically at a vPBX service provider. A call is a connection between a calling party and a called party over a network. A caller, or calling party, is a person or device who initiates a call.

For example, a vPBX system can obtain the geographic coordinates of a mobile device and correlate these coordinates with known coordinates for known locations associated with a user. A user is a person who uses the vPBX system. The known locations, such as the user's office, home, or other locations, can be defined in the vPBX system. An inference of the user's status can be determined by a set of rules stored in the vPBX system. For example, a vPBX system can determine whether the user is currently out of the user's office, at the user's home, or at another location. The user's status can be made available to other users of the vPBX system and can be used in call management functions, such as routing.

Figure 1:
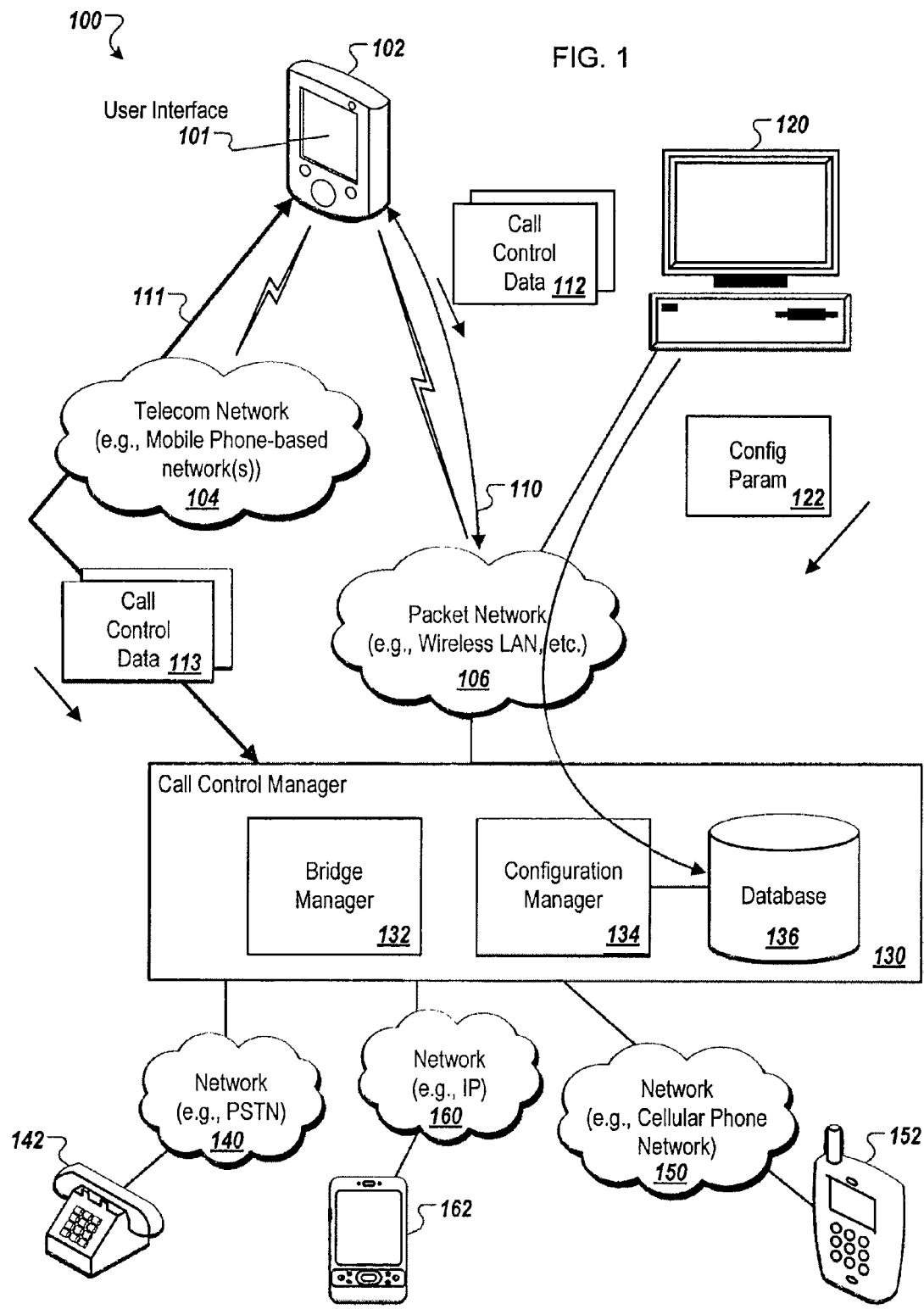
FIG. 1 is a block diagram of an example call management system, including a mobile device configured to interact with a call control manager.

FIG. 1 is a block diagram of a call management system 100, including a mobile device configured to interact with a call control manager 130. In this example, a mobile device 102 can be configured to communicate using multiple modes of communication (i.e., "multi-modal channels of communication"). Network 104 operates in accordance with a first mode of communication. Examples of the first mode of communication include Public Switched Telephone Network ("PSTN") phone technologies, cellular/wireless telephone technologies/standards, such as Global System for Mobile communications ("GSM"), Frequency Division Multiple Access ("FDMA"), Time Division Multiple Access ("TDMA"), Code division multiple access ("CDMA"), and the like. Network 106 operates in accordance with a second mode of communication. Examples of the second mode of communication include VOIP phone technologies, wireless LAN technologies (e.g., telephone technologies/standards, such as WiMAX and any other IEEE 802.xx-based technologies/standards), and the like. Any number of modes is possible.

Further to FIG. 1, mobile device 102 can be configured to interact with a call control manager 130, over a call control communications channel, which in some implementations can be a broadband call control channel 110. In some implementations, broadband call control channel 110 can be established in network 106 (e.g., in the same or separate channel used to convey voice/video data, such as in a Session Initiation Protocol ("SIP") message). Note that in some implementations, another narrowband call control channel 111 can be established in network 104 (e.g., a mobile operator can provide in the same or separate channel used to convey voice/video data, such as in an Short Message Service ("SMS") message). Mobile device 102 and/or call control manager 130 can be configured to establish narrowband 111 and/or broadband 110 call control channels so mobile device 102 and/or call control manager 130 can transmit and/or receive call control data 113 (over the narrowband call control channel 111) and/or 112 (over the broadband channel 110). Call control manager 130 can be configured to effect a number of call controlling functions that can be performed remotely from mobile device 102. Thus, call control manager 130 can perform call control operations in association with a first call from a phone 142 via network 140 and/or a second call from a phone 152 via network 150 and/or a second call from a phone 162 via a network 160. In one implementation, call control manager 130 can be disposed in a central office ("CO"). In another implementation, mobile device 102 includes an interface, such as a user interface 101, for facilitating generation, receipt, and processing, and management of call control data 112 and 113 for delivery over narrowband 111 and/or broadband 110 call control channels. Interface 101 can be configured to implement the functionalities described therein, including receiving inbound calls, dialing outbound calls, and click to call generating a combined inbound and outbound call.

In at least some implementations, call control manager 130 includes a bridge manager 132, a configuration manager 134, and a repository ("DB") 136. Bridge manager 132 can be configured to perform inbound call delivery, call routing, call transfer functions, conference call functions, and the like, for mobile device 102. Note that call control manager 130 provides for bridging calls generated by disparate telecommunications technologies associated with communications devices 142 and 152 and 162. For example, as an alternative to answering an inbound call on mobile device 102, the call can be recorded (such as voice mail) on mobile device 102 and/or on the call control manager 130 and simultaneously reviewed on mobile device 102 via user interface 101. During call recording, the inbound call can be answered dynamically at mobile device 102 and/or transferred to one or more of communications devices 142, 152, and 162. Completed recordings (e.g., announcements, voice mail, etc.) can be reviewed at mobile device 102 via user interface 101.

Configuration manager 134 can be configured to interact with a remote computing device 120 or with a mobile device 102 to receive configuration parameter data ("conf param") 122. Further, configuration manager 134 can be configured to store configuration parameter data 122, and responsive to such data, call control manager 130 can be implemented by a user to control inbound calls before, during, or after reaching mobile device 102. Further, configuration manager 134 can be configured to store in database 136 audio files recorded via user interface 101 on device 102 and transmitted to call control manager 130 via narrowband 111 and/or broadband 110 call control channels.

Example Call Manager

Figure 2:
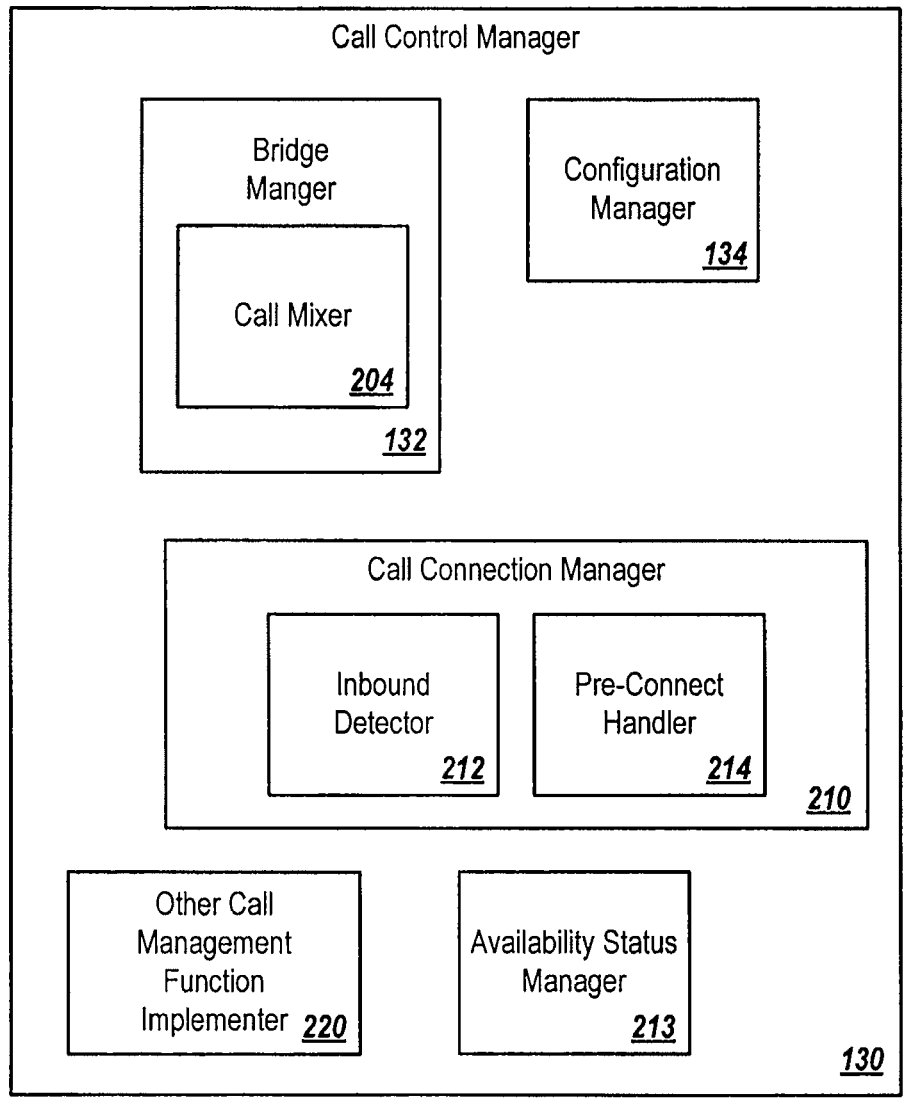
FIG. 2 is a block diagram of an example call control manager.

FIG. 2 is a block diagram of an example call control manager 130. Call control manager 130 can include a bridge manager 132, a configuration manager 134, a call connection manager 210, an available status manager 213, and a call management function 220 configured to implement any other call control function described herein. Bridge manager 132 can include a call mixer 204. In some cases, call mixer 204 can be configured to combine calls using various telecommunication technologies and protocols. Thus, call mixer 204 can use different CODECs to implement the various telecommunication technologies and protocols. In some cases, mixer 204 can reside in the mobile device, which can be a mobile device 102. Call connection manager 210 can include an inbound detector 212 and a pre connection handler 214. Inbound detector 212 can detect a call from any communications device (e.g., communications devices 142 or 152 or 162 of FIG. 1) and can determine whether a communication link via network 106 of FIG. 1 to mobile device 102 can be established. For example, inbound detector 212 can communicate with mobile device 102 to determine whether a data rate of more than, for example, 8 kb/sec is obtainable. If not, inbound detector 212 can provide a course of action (e.g., sending the call to voicemail) until the data rate is above some acceptable threshold. Pre-connect handler 214 can interact with mobile device 102 to receive an instruction from call control data 112 to handle a call from either communications device 142 or communications device 152 of FIG. 1 before a connection is made. Pre-connect handler 214 can also interact with mobile device 102 to receive an instruction from call control data 113 to handle a call form any of communications devices 142, 152, and 162 of FIG. 1. For example, call control data 113 can be incorporated into an SMS message (or any other type of messaging protocol) capable of transport via network 104. Thus, mobile device 102 can generate call control data 113 that includes an instruction that causes call control manager 130 to generate a message to any of communications devices 142, 152 and 162 of FIG. 1. An example of such a message is "I am out of wireless LAN range. I will call you later when I can make a VOIP call." Any of the components of call control manager 130 can be implemented in hardware or software, or a combination thereof.

Example Mobile Device Implementation

Figure 3:
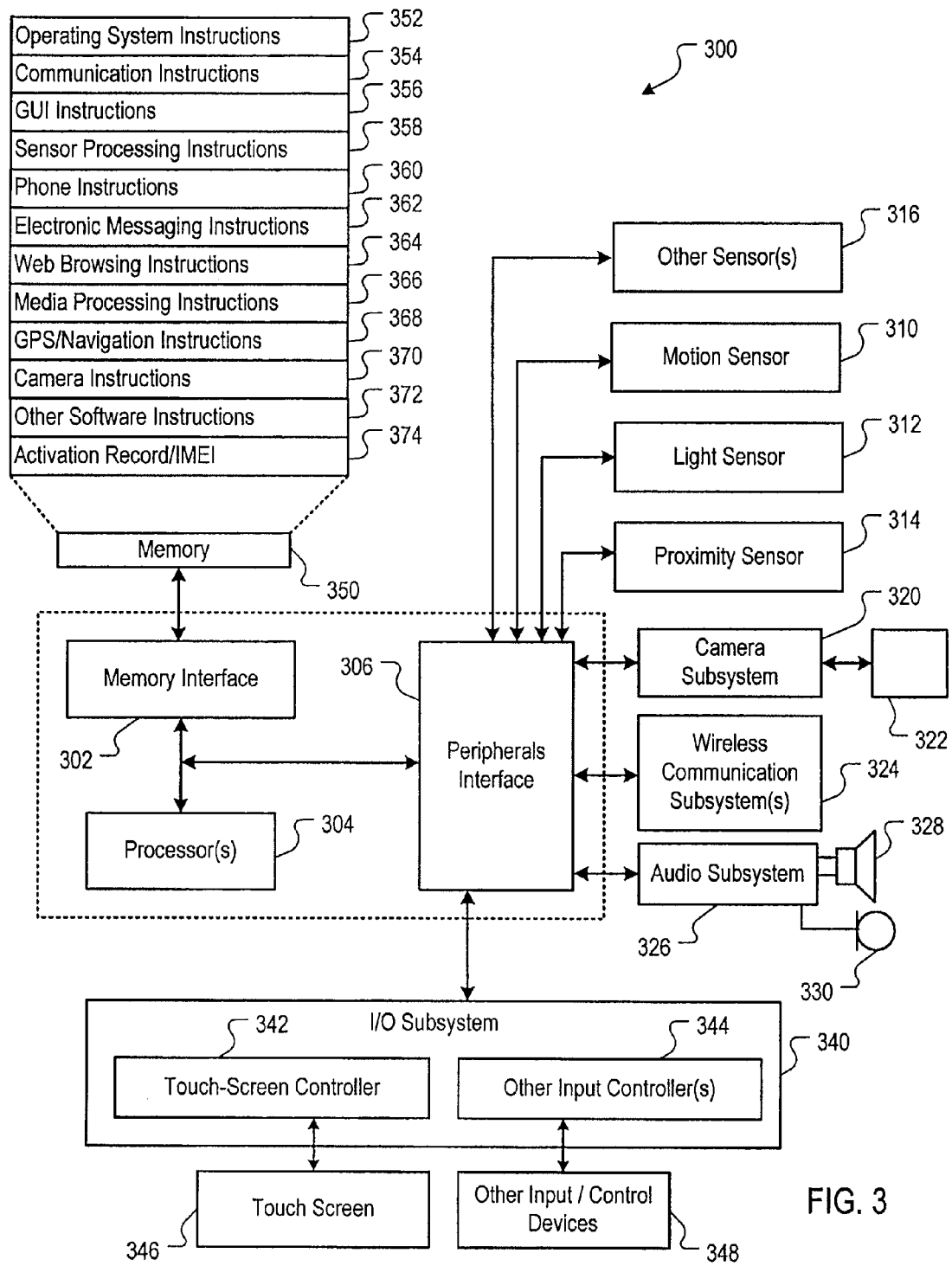
FIG. 3 illustrates an example system architecture of a mobile device.

FIG. 3 is a block diagram of an example architecture 300 of a mobile device (e.g., mobile device 102). The mobile device can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 306 to facilitate orientation, lighting, and proximity functions. Other sensors 316 can also be connected to the peripherals interface 306, such as a positioning system (e.g., GPS receiver), a temperature sensor, a biometric sensor, or other sensing device, to facilitate related functionalities. A GPS receiver can be integrated with, or connected to, a mobile device.

A camera subsystem 320 and an optical sensor 322, e.g., a charged coupled device ("CCD") or a complementary metal-oxide semiconductor ("CMOS") optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device is intended to operate. For example, a mobile device can include communication subsystems 324 designed to operate over a GSM network, a GPRS network, an EDGE network, a Wi-Fi or WiMax network, and a Bluetooth™ network. In particular, the wireless communication subsystems 324 can include hosting protocols such that the mobile device can be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration can disengage a lock of the touch screen 346; and a pressing of the button for a second duration that is longer than the first duration can turn power to the mobile device on or off. The user can be able to customize a functionality of one or more of the buttons. The touch screen 346 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 can include instructions for handling basic system services and for performing hardware dependent tasks. In some implementations, the operating system 352 can be a kernel (e.g., UNIX kernel).

The memory 350 can also store communication instructions 354 to facilitate communicating with one or more additional devices, one or more computers and/or one or more servers. The memory 350 can include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions, e.g., access control management functions as described in reference to FIGS. 5 and 6. The memory 350 can also store other software instructions (not shown), such as web video instructions to facilitate web video-related processes and functions; and/or web shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity ("IMEI") 374 or similar hardware identifier can also be stored in memory 350.

Each of the above identified instructions and applications can correspond to a set of instructions for performing one or more functions described above. These instructions need not be implemented as separate software programs, procedures, or modules. The memory 350 can include additional instructions or fewer instructions. Furthermore, various functions of the mobile device can be implemented in hardware and/or in software, including in one or more signal processing and/or application specific integrated circuits.

Example Call Management Process

Figure 4:
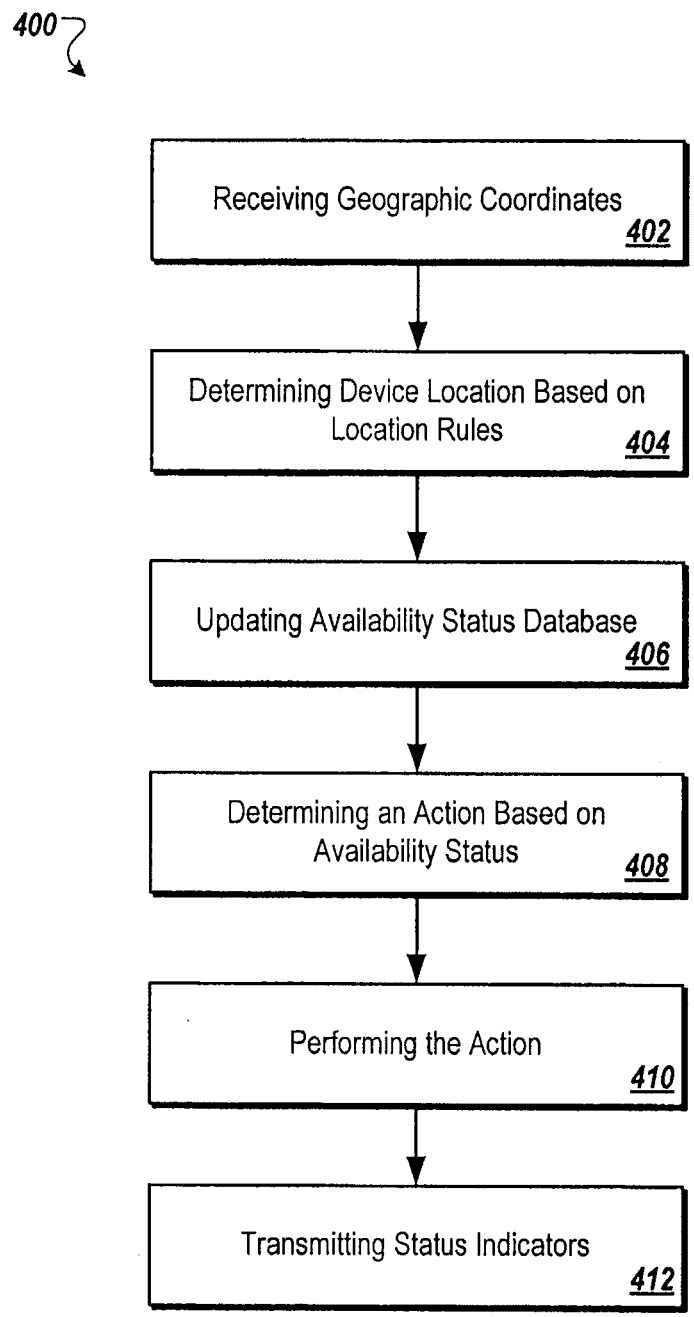
FIG. 4 is a flowchart illustrating an example process of call management of location-aware mobile devices.

FIG. 4 is a flowchart illustrating an example process for managing calls to and from location-aware mobile devices. In step 402, a location of a mobile device is received. A device locator in a vPBX system receives geo-location information of a mobile device connected to the vPBX system. A geo-location is a set of geographic coordinates that identify a real-world geographic location of the mobile device. The geographic coordinates can contain latitude, longitude, and altitude. Latitude and longitude information is useful in identifying the location of the mobile device on a map. Altitude information is useful in identifying, for example, on which floor the mobile device is located in a building.

The geographic coordinates of the mobile device can be determined in a variety of ways. For example, a GPS receiver integrated with, or coupled to, the mobile device can determine the physical location of the mobile device. A triangulation program can also determine the physical location of the device, by way of measuring the relative position of the mobile device against reference places with ascertained geographic positions, e.g. extremely low frequency ("ELF") and microwave (cellular phone) transmission towers. The relative position can be measured, for example, by calculating a time difference between the towers for receiving a signal from the mobile device. The triangulation program can operate on a server in a network to which the mobile device is connected.

The triangulation program can also operate on the mobile device, by way of keeping a list of reference places one the mobile device.

Furthermore, the geographic coordinates of the mobile device can be determined by a Wi-Fi network whose geographic locations are known. The mobile device can connect to a particular Wi-Fi network if the mobile device is within a range of an access point of the Wi-Fi network. A vPBX system can identify one or more Wi-Fi access points whose geographic locations are known (e.g., an office network located in a particular office). The geographic coordinates of the mobile device can be approximately identified if the mobile device is connected to the access point. Thus, even a mobile device not equipped with a GPS receiver or a triangulation program can be a location-aware device based on the device's connection to a Wi-Fi access point. In some implementations, a vPBX system can identify to which Wi-Fi network and which access point a mobile device is connected by a network name, a Wired Equivalent Privacy ("WEP") or a Wi-Fi Protected Access ("WPA") login, etc.

In some implementations, a mobile device can transmit its geo-location information to the vPBX network by running a client application to transmit the geo-location of the mobile device at fixed intervals, e.g., every five minutes.

Alternatively, in some other implementations, a mobile device can run a client application that triggers the transmission according to certain rules. The mobile device can store a set of rules that specify geographic coordinates for various pre-defined logical "areas" (e.g., home, office, etc.). Users set a specific location in rules either manually or using current GPS coordinates in the mobile device. When the mobile device determines that the device has changed areas (e.g., moved away from an area designated as "office"), the device sends a request to update the device status stored on the main vPBX system. Comparing to fixed-interval update, the triggered update technique can cut down on useless update traffic to the system.

The device locator can also acquire the geo-location information of mobile devices by polling the mobile devices in the vPBX system. The vPBX system sends a command signal to mobile devices that are connected to the vPBX system. The devices respond by transmitting their geo-locations back to the system. The polling can be periodical. The polling can also be triggered by an event. An example of such event is the system receiving a call from a phone either within the vPBX network or outside the vPBX network.

In a next step 404, at least one location rule is accessed in order to relate the location of the mobile device to at least one pre-determined location. The device locator determines a location based on the geographic coordinates received. The determination can be made by mapping the geographic coordinates received with location rules in a location database. A match exists when the geographic coordinates received are the same as a set of coordinates in the database, are within the proximity of a set of coordinates in the database, or are within a space defined by a set of vertices in the database. An example of such a match is that a latitude, longitude, and altitude of the mobile device is within a space defined in the database, and the space is defined as a "home."

In a next step 406, the device locator updates an availability status database based on the at least one accessed location rule. The availability status database can contain the most current location information on mobile devices in the vPBX network. The availability status database can also contain a location history for mobile devices.

In a next step 408, an action mapper applies at least one action rule based on a pre-determined location. By consulting a status database, the action mapper determines an action upon receiving a phone call to a mobile device. The action mapper identifies the device being called. The action mapper checks the availability status database to determine the location of the mobile device, e.g. whether the mobile device is at "home." The action mapper checks an action database to determine what action to perform, based on at least one action rule, and the location of the mobile device. For example, a vPBX server can have the knowledge that the mobile device being called is at "home." An action rule can include geographic location based routing instructions. One example action rule can be "routing the call to a landline number, which can be a landline phone number for the home."

In a next step 410, actions identified by the action mapper are performed. For example, the phone call to the mobile device in the vPBX network is routed to the landline number in the home, based on the action identified in the action rule. Routing can include dialing an extension number for another extension in the vPBX network, dialing a number that is outside the vPBX network, connecting to a voice mail system, or putting the call to a customer service queue. An extension is an internal device, such as a mobile device or landline phone, that is connected to a vPBX system. The vPBX system operates as a switchboard for the extensions. Each extension can be associated with one or more extension numbers. Each extension number can be associated with one or more extensions.

In a next step 412, a status update is performed. A current availability status of the called mobile device is provided to other mobile devices for display. The mobile device's status is transmitted to other mobile devices from a vPBX server. A mobile device in the vPBX network can receive status updates for other mobile devices. The status update can be configured to display on certain devices in a network. For example, a secretary's mobile device can be configured to receive status updates of a supervising manager, in order for the secretary to know if the supervising manager is in office or at home. The status update can occur when a vPBX server receives a location update from a mobile device, or when a vPBX server routes a call.

Example Availability Status Manager

Figure 5:
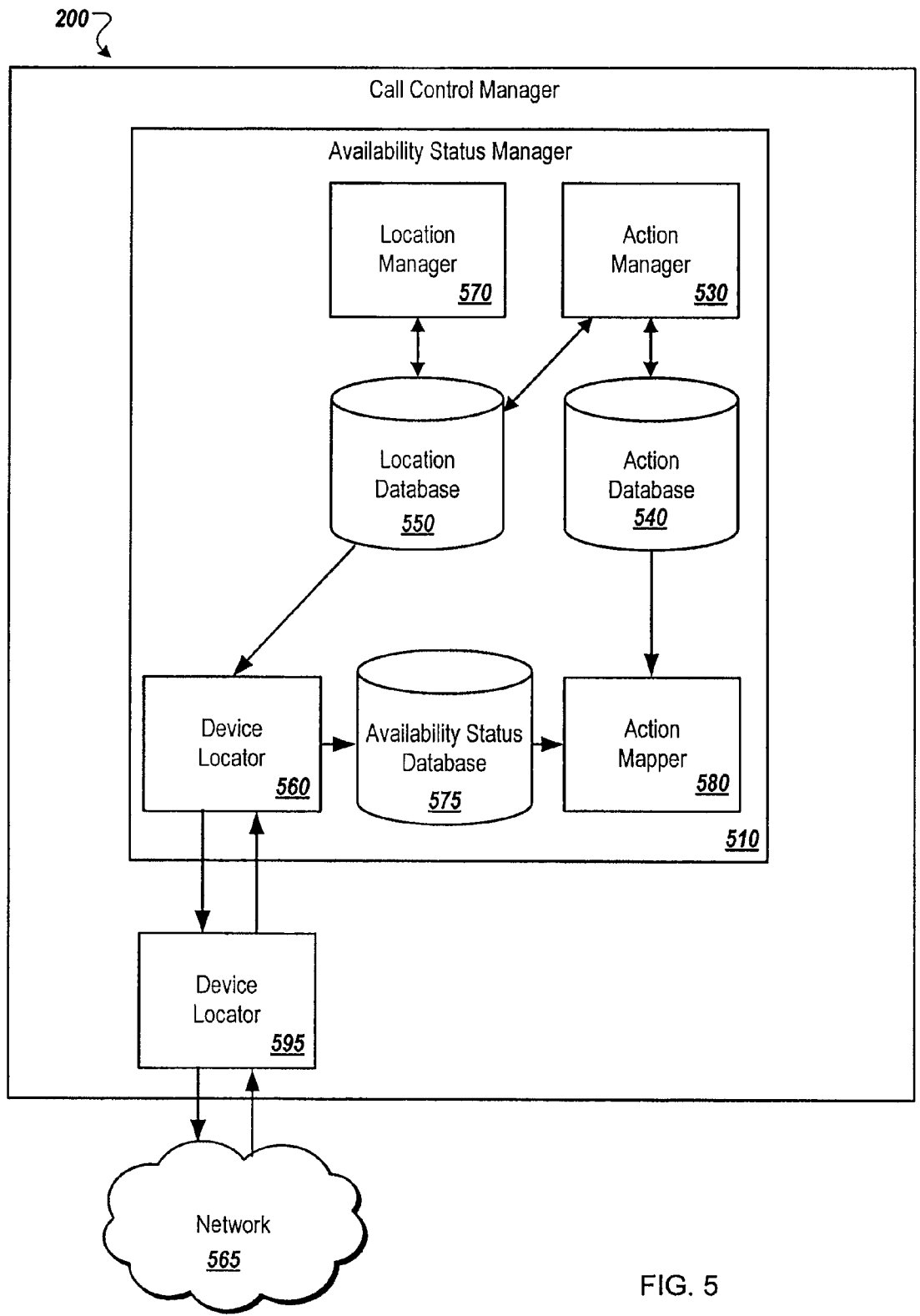
FIG. 5 is a block diagram of an example architecture of an availability status manager.

FIG. 5 is a block diagram of an example architecture 200 of an availability status manager. A call control manager 130 in the vPBX system contains an availability status manager 213. The availability status manager 213 interacts with other components of the call control manager 130, e.g. a bridge manager 132, a configuration manager 134, and a call connection manager 210 to manage voice and data communications in the vPBX network.

Availability status manager 213 can contain action manager 530 and action database 540. Action database 540 is a repository of action rules. An action rule determines what action the call control manager 130 performs when a mobile device at a specified location receives a call. For example, an action rule can state "if a mobile device is in office, reroute the call to a land line phone number in that office." Action manager 530 is responsible for adding, editing, and deleting the action rules in the rule database 540. Action manager 530 can interact with other components of call control manager 130 to provide user interface to facilitate the adding, editing, and deleting of the rules in the rule database 540.

In some implementations, availability status manager 213 also contains a location database 550 and location manager 570. The location database 550 is a repository of location rules associating location labels with geographic locations.

For example, the location database 550 can contain a mapping rule that if a mobile device is located within five meters from latitude x, longitude y, and altitude z, then the location status of the device is "office." The term "five meters" is a proximity radius. A proximity radius is helpful because a proximity radius can facilitate successful mapping when the device is in the proximity of a predetermined location rather than requiring an exact location match. For another example, the location database 550 can contain another mapping rule that if a mobile device is located within a space defined by vertices A, B, C, D, E, F, G, and H, the location status of the device is "home." The geographic coordinates of vertices A through H are also stored in the location database 550. The location manager 570 can contain software tools for modifying the location rule database. In yet another example, location database 550 can contain names of pre-defined features such as "California." Availability status manager 213 can determine whether a mobile device is within the pre-defined feature by comparing a current geographic location of the mobile device with boundaries of the pre-defined feature. Such boundaries can be contained in a digital geographical referencing system such as the Topologically Integrated Geographic Encoding and Referencing ("TIGER") system of the United States Census Bureau. Availability status manager 213 can make the determination based on an imported TIGER file, or by consulting an external system.

Availability status manager 213 also contains an availability database 575. Availability database 575 stores the most current availability status of mobile devices within the vPBX network. Availability status of a mobile devices describes the status of the device, e.g. "home," "out of town," or "office."

Availability status manager 213 also contains a device locator 560. Device locator 560 is responsible for receiving the geo-location information from the mobile devices within the vPBX network. Device locator 560 works with other components 595 in the call control manager 130 to get device geo-location information from a communication network 565. In various implementations, the device locator 560 can actively poll the mobile devices within the vPBX network or passively receive the geographic information from the mobile devices. After receiving current geographic coordinates from a mobile device, the device locator 560 matches the geographic coordinates with the location rules in the location database 550. The match can be an exact match, a proximate match when the current geographic coordinates are within the proximate radius of a location, or a space match if the current geographic coordinates are within a space defined by a set of vertices. If the device locator 560 finds such a match, the device locator 560 updates the availability status database 575.

When the call control manager 130 detects a call to a mobile device connected to the vPBX network, the call control manager 130 checks the device status by querying the availability status database 575. The call can be originated from outside the vPBX network or originated within the vPBX network. The call can be to a mobile device. An action mapper 580 queries both the availability status database 575 and action database 540 to determine what action to take on the call to the mobile device. For example, if the status of a device is "office" in the availability status database 575, and an action rule states "if a mobile device is in office, route calls to that mobile device to a landline phone number in that office," then the action mapper 580 instructs call control manager 130 to reroute the call to the landline phone number in that office.

A vPBX network can support both location-aware mobile devices and location-ignorant mobile devices. If a mobile device is not integrated with or connected to a geographic positioning system, the mobile device can be location-ignorant. The vPBX system can still route calls whose destinations are other devices to a location-ignorant device. For location-ignorant devices, a vPBX system can also maintain an "out-of-range" rule, which applies when the device cannot be contacted.

Example User Interfaces for Editing Location Rules

Figure 6:
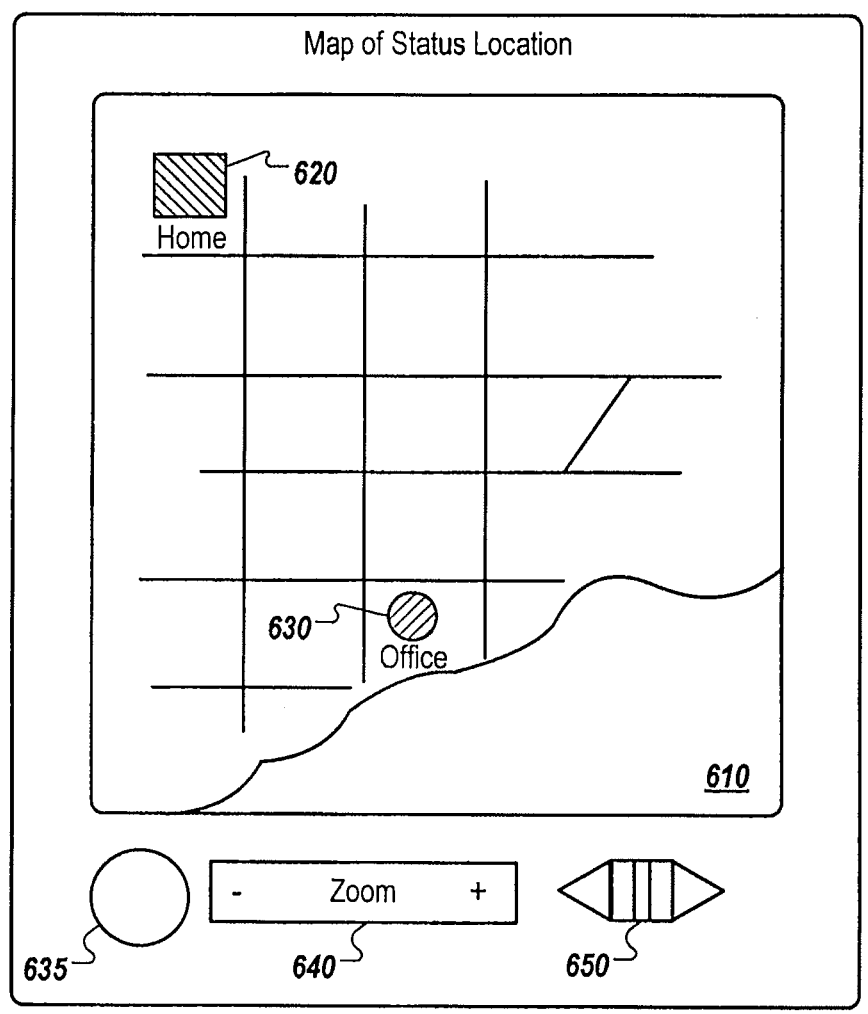
FIG. 6 is an example display of availability status on a mobile device.

FIG. 6 is an example user interface 600 for editing location rules on a mobile device. For example, a user can review and edit location rules stored in location database 550. The user interface 600 displays a user-selected view of a digital map 610. The geographic data for digital map 610 can be provided by a map server. A map server can be a component in a vPBX server. A map server can also be a remote Internet based map service, such as Google Maps. One or more components of a vPBX server can communicate with a remote map service through an application-programming interface ("API"). The API can allow a map to be displayed on a mobile device, as well as determine the geographical coordinates received as an input to the map.

Areas on map 610 where a location rule is active are highlighted. For example, area 620 on map 610, which is designated in the location database 550 as "home," is highlighted. Similarly, area 630, which is designated in the location database 550 as "office" is also highlighted. The shapes and sizes of the areas can be determined by the proximity setting in the location database 550. For example, the rectangle shape of area 620 is dictated by a location rule that if the device is within a rectangle designated by four vertices, no matter what altitude, the location is "home." The round shape of area 630 is dictated by a location rule that contains a proximity radius. The size of the round shape of area 630 is determined by the value of the proximity radius. A user can navigate the digital map 610 by touching-and-dragging on the user interface 500. A user can also navigate the digital map 610 by tapping a button 635. Button 635 activates a GPS receiver that is integrated with or connected to the mobile device, which determines a current location of the mobile device. The mobile device can move the map 610 such that the current location is centered on the map 610. A user can define location rules based on the current location.

In some implementations, digital map 610 can be a map that contains elevation information. Some example maps that contain elevation information can be terrain maps or thematic maps that contain data on the height of buildings. By tapping button 635, a user can activate a GPS receiver that is integrated with or connected to the mobile device to determine the latitude, longitude, and altitude of a current location of the mobile device. The user can therefore enter into the vPBX system three-dimensional coordinates that can be useful, for example, to determine on which floor the mobile device is located in a high-rise building, or whether the user is in her upstairs home office or in other parts of her home. Location rules can be made based on altitude information.

The user can use zoom control 640 and scroll control 650 to navigate the map. Other navigation controls are also possible. For example, the user interface 600 can allow a user to zoom in and out by double tapping or multi-touching. Multi-touching can include touching a user interface 600 with multiple fingers, and moving the fingers towards each other or apart while dragging on a screen. The user can enter edit mode to change or delete a status-location mapping by tapping the highlighted area for that mapping. For example, by tapping highlighted area 630, a user can give a new designation to the area 630 (e.g. by designating it as "work"), give a new location to the current designation "office," or change the proximity radius. The user can also enter a "new" mode to create a new mapping by tapping an area on the map 610 that is not highlighted.

Example User Interfaces for Defining Availability Status

FIG. 7 shows an example user interface for a user to define availability status based on a current location of a mobile device. The user interface allows a user to enter one or more parameters into a call management system such as a call control manager 130. The parameters can include a current location of a mobile device or a location designated by a user. The current location of the mobile device can be determined by a positioning system integrated with or coupled to the mobile device. The user interface further allows a user to designate the current location as a pre-determined location in the call manage system, which can be associated with action rules.

In the example in FIG. 7, a user enters the user's current location into the location manager 570 on a mobile device screen 700. The screen 700 displays information that assists the user to identify the current location of the mobile device. For example, the screen 700 can display the current address where the mobile device is located. The current address is determined based on the current geographic location of the mobile device.

In some implementations, the screen 700 is capable of receiving touch-screen input. The screen 700 can show a group of buttons to determine acceptable proximity radii. For example, the screen 700 can show a button 710 entitled "Register current room." This button 710 is configured such that the proximity radius is set to five meters. Alternatively, the button 710 can have a title "Radius 5 m" to achieve the same purpose. The button 710 can also be associated with any caption that is easily understood by the user. If the proximity radius is set to five meters, the vPBX system will consider the mobile device to be at this location if the device comes within five meters of the current location. Similarly, another button 720 can have the caption "register current building," configured to set the proximity radius to 20 meters. Another button can have the caption "register current street block," configured to set the proximity radius to 100 meters. Yet another button 740 can have the caption "register current city" to set the radius to five miles.

In another example implementation, instead of displaying numerical values to a user or asking for user selection of a room, building, or a city, a display screen 700 can be configured to display a map of a specified location. A user can enter a proximity radius, for example, by dragging and zooming a circle that is displayed overlaying the map. The radius of the circle on the overlaid map can be used to determine a proximity radius.

An alternative to selecting a proximity radius is to select a geographic feature. In some implementations, a geographic feature can pre-defined in a digital map. For example, if a room, a building, a street, or a city has pre-defined boundaries, the buttons 710, 720, 730 and 740 can be configured to define an area, the area corresponding to the room, building, street or city, respectively. Entering the current location under these configurations will cause the location-status mapping to map a polygon to a status in the location manager. An example of geographic features having predefined boundaries is the TIGER system.

Similarly, a display device can allow a user to select from other geographically defined features, such as zip code, county, state, or country. A user can select from a map one or more locations and define geographical rules associated with the location. For example, a rule can be if the user is out of a country, then route a call to a voicemail server.

The selected geographic feature is not limited to one single entity on a map. For example, a user interface can allow a user to select one or more streets, highways, or freeways. A user interface can also allow a user to select, for example, all interstate freeways or local streets in an area. An action rule can be that if a user is on a freeway, route a phone call to a hands-free car phone. An action rule can also be that if a user is on a local street, and presumably in more complex driving conditions, route a phone call to a voice mail.

When a geographic feature, such as a group of streets or a state is complex, the mobile device need not define all the boundaries and vertices and submit them. If the feature is defined in a digital geographical referencing system, a user can submit the defined feature instead of boundary information. For example, a user need not submit a polygon defining "the continental United States" when "the continental United States" is a feature defined in the system. A vPBX server can allow names to be entered, and consult the digital geographical referencing system in real time to determine if the device is in the boundaries of the continental United States. In one example implementation, a vPBX server can connect to an Internet based map service, provide the map service as input the geographic coordinates of a mobile device, the name (or ID) of a predefined geographic feature, and receive as an output a determination whether the mobile device is within the predefined geographic feature.

In some implementations, a geographic feature need not be predefined and can be drawn on a screen 700. Screen 700 can display a map. A user can select an area on the displayed map by dragging a finger on the display screen 700 to draw one or more boundaries of an area. A processor in the mobile device can create a polygon with vertices and edges based on the user-drawn boundaries. The polygon can be elastic, i.e., automatically or manually adjusted to approximate a feature on the map such as a street block, when the finger dragging is not an exact match of the street block but can be interpreted as an approximation of the street block. The polygon can be transmitted to a vPBX server as an input to an action rule.

In some other implementations, a geographic feature can be determined by an address, when a thematic map is used by a vPBX server. A thematic map is a map that contains not only geographic information, but also other information associated with geographic features. For example, a feature "Indian Springs Park" can be associated with a geographical shape in a thematic map. Instead of entering a location by other means, a user can simply enter "Indian Springs Park" to enter a location. Similarly, a user can enter a street address, a company name, or a city name to identify a location for the vPBX system as an input.

Screen 700 also shows a label input area 750. In some implementations, label input area 750 can be either a text box or a drop down menu, or an editable drop down menu. Upon tapping label input area 750 by a user, the screen 700 can show a keyboard, whereupon the user can type a label. Alternatively, upon tapping status input area 750 by a user, a drop down menu can be displayed. The drop menu can contain the user's existing labels, e.g. "home," "office," etc. as menu items.

Screen 700 also can show an action input area 755. If the user is entering a new location, e.g., "city hall," the user can create a new action rule in the vPBX system for that new location. The actions can be predefined actions listed as menu items in a drop down box. Example of the actions can be routing phone calls to a landline number, routing phone calls to another mobile device, routing phone calls to a voice mail recorder, etc.

Screen 700 also can show a "submit" button 750. If the user touches the submit button 750, the mobile device can transmit to the vPBX system the current geographic coordinates of the mobile device, the proximity radius or geographic boundaries of the current geographic feature, the availability of this location, and action. The proximity radius or geographic boundaries of the current geographic feature will be stored in the location database. The location and action will be stored in the action database. The availability of this location will be stored in the availability status database on the availability status manager 213.

Example User Interfaces for Editing Action Rules

FIGS. 8A-8F show an example user interface for editing the action rules and location rules.

In FIG. 8A, a mobile device user defines a location-based call routing rule on the device screen 810. A location-based call-forwarding rule causes the vPBX system to reroute an incoming phone call to a specified device when the mobile device is located at a specific geographic location, proximate to a specific geographic location when a proximate radius is set, or within a specific geographic space if the boundaries and vertices of the spaces can be defined. One screen 810, the user touches a button "add location" to add a geographic location. This location can be either a location entered by the user or the current location of the mobile device In FIG. 8B, the user selects a method to enter a location. The user can choose to enter an address manually, or by using the current location of the mobile device. Screen 820 also allows the user to give a label to the location. The label-location mapping will be stored as a part of a location rule in the vPBX system. The user can also define the forwarding phone number on screen 820. The action of forwarding the phone call and the forwarding number will be stored as parts of an action rule in the vPBX system.

In FIG. 8C, the user can enter the current location of the mobile device on screen 830. The user can tap the "current location" button to register the current location of the mobile device. The current location of the mobile is determined by a GPS receiver built into the mobile device, or by running a triangulation program. Screen 830 also allows the user to give a label to the location. The user can also define the forwarding phone number on screen 830.

In FIG. 8D, the user can enter an address as a location in the "enter address" area on screen 840. The "enter address" area can be a text box in which the user can type an address. In this example, the user types "1 Lagoon Drive, CA 94805." The "enter address" area can also cause the screen 840 to show a map, where upon the user can select a geographic location. If a user enters an ambiguous address, for example, "634 36th Ave., Richmond," a dialog box can popup and ask the user whether the user intends to enter "634 36th St, Richmond, Calif. 94805" or "634 N. 36th St, Richmond, Va. 23223." Screen 840 also allows the user to give a label to the location. In this example, the user gives a label "Office" to the address 1 Lagoon Drive, CA 94065. The user can also define the forwarding phone number on screen 840.

FIG. 8E illustrates a mobile device display screen 850 after a user enters a location mapping and an action. Display screen 850 shows two buttons, one labeled "Office" and another one "Add Location." Tapping the button "Add Location" will cause the screen 850 to switch to an add location screen as shown in FIG. 8B. Tapping the button "Office" will cause the screen 850 to switch to an edit location screen.

FIG. 8F shows a mobile device display screen 860. Screen 860 enables the user to edit a location rule by displaying the current association between an address (1 Lagoon Drive, CA 94065) and a label (Office). The user can tap either an address entering area to enter a new address for label "Office" or a label area to give a new label to address "1 Lagoon Drive, CA 94065." Screen 860 also enables the user to edit an action rule by changing the forwarding destination. Furthermore, screen 860 enables the user to delete the location rule and the action rule by tapping a "Delete Location" button.

Example Combined Action/Location Rules Database Table

FIG. 9 illustrates an example rule database table 900. Each mobile device in the vPBX system can have a corresponding database table 900. Database table 900 has columns LAT 910, LONG 920, ALT 930, PROXIMITY_RADIUS 940, LOCATION 950, and ACTION 960. Column LAT 910 can store latitude information, e.g. N33.7817. Column LONG 920 can store longitude information, e.g. −117.5835. Column ALT 930 can store the altitude information, e.g. +50 for 50 meters above sea level. Column PROXIMITY_RADIUS 940 can store the proximity radii of a location, e.g. 20 for 20 meters. Column LOCATION 950 can store a location label, e.g. "Office." Column ACTION 960 can store the action when the mobile device to which the database table 900 is associated moves to a place within the proximity radius of the geographic location defined by the LAT 910, LONG 920, and ALT 930 data columns. An action can be "forward call to 545-888-7777."

The database table in FIG. 9 illustrates an implementation where action rules and location rules are stored in a converged location and action database. Each mobile device can be associated with a database table 900. Action rules and location rules do not have to be in a converged database. Other implementations are possible, for example, by using separate action and location databases.

FIG. 9 illustrates an implementation where proximity radius is used. In some implementations, a current location of a mobile device can be related to a pre-determined location stored in a database table 900. The current location can be related to the pre-determined location if the distance between the geographic location of the mobile device defined by a current latitude, current longitude, and current altitude and a predetermined location defined by latitude 910, longitude 920, and altitude 930 is less than or equal to a predetermined proximity radius 940.

Other implementations are possible where a geographic area is associated with an action. In some implementations, a current location of a mobile device can be related to a pre-determined location if the geographic location of the mobile device is within a space defined by predetermined vertices. The geographic location of the mobile device can be defined by the geographic coordinates, such as latitude, longitude, and altitude of the mobile device. A database can store polygons or polyhedra by storing the geographic coordinates of the vertices of the polygons or polyhedra. Simple geometrical calculations can be applied to determine if a current location of a mobile device is within a polygon or a polyhedron whose vertices are known.

In another implementation, call routing can be based on the motion speed of a mobile device. A GPS receiver or other positioning system that is integrated with or connected to a mobile device can identify the moving speed of the mobile device. A vPBX server can determine the moving speed of the mobile device by triangulation, based on the relative distances between the device and one or more cellular towers or other landmarks with known positions. Alternatively, the motion speed can be transmitted from the mobile device to a vPBX server.

In some implementations, a mobile device can transmit its motion speed information to the vPBX network by running a client application to transmit the motion speed of the mobile device at fixed intervals, e.g., every five minutes.

Alternatively, in some other implementations, a mobile device can run a client application that triggers the transmission according to certain rules. When the mobile device determines that the device has changed motion speed (e.g., from zero to 30 miles per hour), the device sends a request to update the device status stored on the main vPBX system. Comparing to fixed-interval update, the triggered update technique can cut down on useless update traffic to the system.

Based on the current motion speed of a mobile device, a vPBX server can access one or more speed rules. A speed rule can relate the motion speed of a mobile device to one or more pre-determined motion speed categories. For example, if the mobile device is moving at speed that is greater than a pre-determined threshold, the mobile device changes the value of a "moving" status from "stationary" to "driving." A vPBX server can update a status database, based on the accessed speed rule. The status can also be determined by the location of the mobile device in conjunction with the motion speed of the mobile device. In some implementations, a vPBX system can change the status of a mobile device in a database from "stationary" to "driving" when the mobile device is both located on a street and moving at a certain speed. In some implementations, the vPBX system can change the status of a mobile device in a database from "stationary" to "driving" when the mobile device moves at or above a certain speed, and from "driving" to "stationary" when the mobile device has been moving at a reduced speed for a certain period of time. By way of illustration, a mobile device can have a "driving" status when the device moves at over 10 miles per hour. The "driving" status can be reset to a "stationary" status if the motion speed of the mobile device decreases to less than three miles per hour and stays at less than three miles per hour for at least three minutes (when the user can be presumed to have stopped driving).

A vPBX server can apply one or more action rule based on the speed rule stored in the database and the current motion speed of a mobile device when a phone call to the mobile device is received. The vPBX server can apply the action rule by consulting the status database, which stores action rules. The action rule can define an action. For example, an action rule can state that if the status of a mobile device is "driving," then the vPBX system issues a warning (that the person called is driving) on the caller's device, or plays a pre-recorded message to the caller, and gives the caller an option to redirect, to hang up, or to go through with the call before a caller is connected to the mobile device. The vPBX system can also route the call according to the action defined in the status database for the status. The vPBX system can further update devices that are qualified to receive a current status of the mobile device, which is in motion, and display a current availability status as "driving" on the display screens of those qualified devices.

In another implementation, call routing can be based on the posture of a mobile device. A mobile device can be integrated with, or connected to, a posture-determining device. A posture determining device can determine the posture of a mobile device, e.g., whether the mobile device is in a vertical, horizontal, upside-down, face-up (e.g., the display screen is facing upwards), face-down, or other posture. Some posture determining devices are accelerometers, which can determine the posture of a device based on an initial posture and subsequent posture changes, and gyroscopes, which can determine the differences between the orientation of a mobile device and a pre-determined orientation.

A vPBX system can receive the posture of a mobile device through a device posture receiver. In some implementations, a mobile device can transmit its posture information to the vPBX network by running a client application to transmit the posture of the mobile device at fixed intervals, e.g., every five minutes.

Alternatively, in some other implementations, a mobile device can run a client application that triggers the transmission according to certain rules. When the mobile device determines that the device has changed postures (e.g., from vertical to face-down), the device sends a request to update the device status stored on the main vPBX system. Comparing to fixed-interval update, the triggered update technique can cut down on useless update traffic to the system.

Based on the current posture of a mobile device, a vPBX server can access one or more posture rules. A posture rule can relate the posture of a mobile device to one or more pre-determined motion speed. In some implementations, if the mobile device changes from upright to facedown, the mobile device can change a value of an "in-use" status from "busy" to "idle," assuming a user just put a device down. A vPBX server can update a status database, based on the posture rule. In some implementations, if a mobile device is in a face-up posture, the vPBX server can set the status of the mobile device to "idle" such that the mobile device can accept calls. If a mobile device is in a facedown posture, the vPBX server can set the status of the mobile device to "busy" and route incoming calls to voice mail.

A mobile device's "in-use" status can also be determined by a status of an accessory connected to the device. In some implementations, a vPBX server can receive an available accessory list of the mobile device. The accessory list can identify devices (e.g., a hands-free microphone-headphone accessory) that are currently connected to the mobile device. The vPBX server can access an accessory rule stored on the vPBX server. The accessory rule can relate the available accessories to a pre-determined accessory or category of accessories that has been specified on the vPBX server. Based on the accessory rule, the vPBX server can update the status of the mobile device. The action rule can determine an action (e.g., a routing plan that specifies that the call be routed to a specific extension) based on the available accessory. When a phone call to the mobile device is received, the vPBX server can route the call according to the action. For example, if a Bluetooth® headset is connected to the mobile device and the headset is turned on, the device's "in-use" "status" can be set to "idle" so that the mobile device can take phone calls. When the headset is turned off, a rule can specify that calls to the mobile device be routed to another device or to voicemail.

A mobile device's "in-use" status can also be determined by a combination of the location of the mobile device, the posture of the device, the motion speed of the device, and status of accessories connected to the device. In some implementations, a vPBX system can keep the "in-use" status of a mobile device in a database as "busy" even when the mobile device has changed posture from upright to face down, when the mobile device is both located on a street and moving at a certain speed. In some implementations, when a mobile device moves a speed that reaches or exceeds a threshold speed (e.g., 10 miles per hour), the vPBX system assumes the mobile device is in a moving car. When a hands-free device (e.g., a Bluetooth® headset) is connected to the mobile device, the vPBX system permits the mobile device to accept calls. If no hands-free device is connected, the status of the mobile device is set to "busy."

A vPBX server can apply one or more action rule based on the posture rule stored in the database and the current posture of a mobile device when a phone call to the mobile device is received. The vPBX server can apply the action rule by consulting the status database, which stores action rules. The action rule can define an action. For example, an action rule can state that if the status of a mobile device is "busy," then the vPBX system issues a warning (that the person called is using the mobile device) on the caller's device, or plays a pre-recorded message to the caller, and gives the caller an option to redirect, to hang up, or to go through with the call before a caller is connected to the mobile device. The vPBX system can also route the call according to the action defined in the status database for the status. The vPBX system can further update devices that are qualified to receive a current status of the mobile device, which is in motion, and display a current availability status as "busy" on the display screens of those qualified devices.

In some implementations, routing a call based on a location, motion speed, and posture of a mobile device can include placing calls in a customer support queue based on geographic location (e.g., via GPS), speed, and posture. In some implementations, routing a call based on location, motion speed, and posture of a mobile device can include applying more than one action rules. For example, an action rule can be routing calls to mobile device A to mobile device B based on device A's location. Another routing rule can be routing calls to mobile device B to mobile device C based on device B's location. In such scenarios, multiple routing can be possible.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a mobile device to perform a certain activity or bring about a certain result. A computer program can be written in any form of programming language (e.g., C++, Java), including compiled or interpreted languages, and it can be deployed in any form, including as a stand-alone program or as a module, component, subroutine, or other unit suitable for use in a computing environment. A computer program can be stored on a computer-readable medium or a storage device.

Suitable processors for the execution of a program of instructions include, by way of example, both general and special purpose microprocessors, and the sole processor or one of multiple processors or cores, of any kind of computer, including mobile device. Generally, a processor will receive instructions and data from a read-only memory or a random access memory or both. The essential elements of a mobile device are a processor for executing instructions and one or more memories for storing instructions and data. Generally, system can also include, or be operatively coupled to communicate with, one or more mass storage devices for storing data files; such devices include magnetic disks, such as internal hard disks and removable disks; magneto-optical disks; and optical disks, flash memory cards, etc. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a system having a display device such as a CRT (cathode ray tube) or LCD (liquid crystal display) screen for displaying information to the user, a keyboard or a touch-screen input device, a pointing device such as navigation buttons, track balls, or touch-screen point device, and a voice command input device by which the user can provide input to the mobile device.

The features can be implemented in a system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet and voice and data network.

A number of implementations have been described. Nevertheless, it will be understood that various modifications can be made without departing from the spirit and scope of the invention. Accordingly, other implementations are within the scope of the following claims.

What is claimed is:

1. A computer-implemented method, comprising:
receiving a location of a mobile device, the mobile device configured to communicate with a telecom service provider and a virtual private branch exchange (vPBX) service provider, wherein the vPBX service provider is different from the telecom service provider, and wherein the mobile device is configured to send outbound calls or receive inbound calls using at least one of the telecom service provider account or the vPBX service provider, and wherein the mobile device is provisioned with one or more vPBX communication services;
accessing at least one location rule for relating the location of the mobile device to at least one pre-determined location, the at least one location rule including a proximity parameter, the proximity parameter defining a proximity distance associated with the at least one pre-determined location, wherein data defining the at least one location rule is provided through an interface associated with the vPBX service provider on the mobile device;
updating a status based on the at least one location rule including updating the status when the location of the mobile device satisfies the proximity distance associated with the at least one pre-determined location;
applying at least one action rule based on the at least one pre-determined location upon receiving a call to the mobile device based on the status, wherein the at least one action rule determines a routing plan based on the pre-determined location; and
routing the call according to the routing plan,
wherein relating the location of the mobile device to the at least one pre-determined location comprises determining that a distance between a geographic location of the mobile device and the at least one pre-determined location is less than or equal to the proximity distance.

2. The method of claim 1, wherein the status is stored in a database.

3. The method of claim 1, wherein a current availability status of the mobile device is provided to one or more other mobile devices for display.

4. The method of claim 1, wherein the at least one pre-determined location comprises a latitude, a longitude, and an altitude.

5. The method of claim 1, wherein relating the location of the mobile device to a pre-determined location comprises determining that a geographic location of the mobile device is within a space defined by predetermined vertices, the geographic location of the mobile device being defined by geographic coordinates of the mobile device.

6. A non-transitory computer-readable medium storing a computer program which, when executed by a computer processor, causes the computer processor to perform operations comprising:

receiving a location of a mobile device, the mobile device configured to communicate with a telecom service provider and a virtual private branch exchange (vPBX) service provider, wherein the vPBX service provider is different from the telecom service provider, and wherein the mobile device is configured to send outbound calls or receive inbound calls using at least one of the telecom service provider account or the vPBX service provider, and wherein the mobile device is provisioned with one or more vPBX communication services;

accessing at least one location rule for relating the location of the mobile device to at least one pre-determined location, the at least one location rule including a proximity parameter, the proximity parameter defining a proximity distance associated with the at least one pre-determined location, wherein data defining the at least one location rule is provided through an interface associated with the vPBX service provider on the mobile device;

updating a status based on the at least one location rule including updating the status when the location of the mobile device satisfies the proximity distance associated with the at least one pre-determined location;

applying at least one action rule based on the at least one pre-determined location upon receiving a call to the mobile device, based on the status, wherein the at least one action rule determines a routing plan based on the pre-determined location; and routing the call according to the routing plan, wherein relating the location of the mobile device to the at least one pre-determined location comprises determining that a distance between a geographic location of the mobile device and the at least one pre-determined location is less than or equal to the proximity distance.

7. The non-transitory computer-readable medium of claim 6, wherein the status is stored in a database.

8. The non-transitory computer-readable medium of claim 6, wherein a current availability status of the mobile device is provided to one or more other mobile devices for display.

9. The non-transitory computer-readable medium of claim 6, wherein the at least one pre-determined location comprises a latitude, a longitude, and an altitude.

10. The non-transitory computer-readable medium of claim 6, wherein relating the location of the mobile device to a pre-determined location comprises determining that a geographic location of the mobile device is within a space defined by predetermined vertices, the geographic location of the mobile device being defined by geographic coordinates of the mobile device.

11. A system comprising:

one or more computers configured to perform operations comprising:

receiving a location of a mobile device, the mobile device configured to communicate with a telecom service provider and a virtual private branch exchange (vPBX) service provider, wherein the vPBX service provider is different from the telecom service provider, and wherein the mobile device is configured to send outbound calls or receive inbound calls using at least one of the telecom service provider account or the vPBX service provider, and wherein the mobile device is provisioned with one or more vPBX communication services;

accessing at least one location rule for relating the location of the mobile device to at least one pre-determined location, the at least one location rule including a proximity parameter, the proximity parameter defining a proximity distance associated with the at least one pre-determined location, wherein data defining the at least one location rule is provided through an interface associated with the vPBX service provider on the mobile device;

updating a status based on the at least one location rule including updating the status when the location of the mobile device satisfies the proximity distance associated with the at least one pre-determined location;

applying at least one action rule based on the at least one pre-determined location upon receiving a call to the mobile device based on the status, wherein the at least one action rule determines a routing plan based on the pre-determined location; and routing the call according to the routing plan, wherein relating the location of the mobile device to the at least one pre-determined location comprises determining that a distance between a geographic location of the mobile device and the at least one pre-determined location is less than or equal to the proximity distance.

12. The system of claim 11, wherein the status is stored in a database.

13. The system of claim 11, the operations further comprising providing a current availability status of the mobile to one or more other mobile devices for display.

14. The system of claim 11, wherein the at least one pre-determined location comprises a latitude, a longitude, and an altitude.

15. The system of claim 11, wherein relating the location of the mobile device to a pre-determined location comprises determining that a geographic location of the mobile device is within a space defined by predetermined vertices, the geographic location of the mobile device being defined by geographic coordinates of the mobile device.

* * * * *

UNITED STATES PATENT AND TRADEMARK OFFICE
CERTIFICATE OF CORRECTION

PATENT NO. : 8,600,391 B2  
APPLICATION NO. : 12/429116  
DATED : December 3, 2013  
INVENTOR(S) : Vlad Vendrow and Vladimir Shmunis Page 1 of 1

It is certified that error appears in the above-identified patent and that said Letters Patent is hereby corrected as shown below:

On the Title Page

On page 3, Other Publications, Column 2, at line 4, please delete "telphony" and insert --telephony--;

On page 3, Other Publications, Column 2, at line 28, please delete "IEE" and insert --IEEE--;

On page 3, Other Publications, Column 2, at line 41, please delete "CCM" and insert --CRM--;

On page 4, Other Publications, Column 1, at line 10, please delete "Chiense" and insert --Chinese--; and On page 4, Other Publications, Column 1, at line 24, please delete "Offcier" and insert --Officer--.

Signed and Sealed this  
Seventeenth Day of June, 2014

Michelle K. Lee  
*Deputy Director of the United States Patent and Trademark Office*